COMPOSITE FILAMENTS

Original Filed March 15, 1965 2 Sheets-Sheet 1

INVENTOR.
Jerome H.Lemelson

INVENTOR.
Jerome H. Lemelson

United States Patent Office

Re. 26,688
Reissued Oct. 14, 1969

26,688
COMPOSITE FILAMENTS

Jerome H. Lemelson, 85 Rector St.,
Metuchen, N.J. 08840

Original No. 3,327,339, dated June 27, 1967, Ser. No. 439,529, Mar. 15, 1965. Application for reissue June 17, 1968, Ser. No. 741,817
Int. Cl. A46d *1/00;* D01d *11/06*
U.S. Cl. 15—209 5 Claims

Matter enclosed in heavy brackets [ ] appears in the original patent but forms no part of this reissue specification; matter printed in italics indicates the additions made by reissue.

*ABSTRACT OF THE DISCLOSURE*

*Composite, elongated, plastic elements are provided which are extruded of a plurality of different polymeric materials, one on the other. Each extrusion has a core portion which is surrounded by a jacket bonded thereto along its length. Both the jacket and core portions are extruded of polymeric materials, with the jacket portion being more flexible than the core portion. The jacket may also be a cellular polymeric material surrounding either a core which is solid through and through or a hollow tube permitting the conduction of fluid therethrough.*

Figure 1:
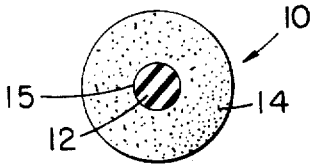

This invention relates to synthetic plastic filaments and is a continuation-in-part of application Ser. No. 239,036 filed Oct. 20, 1962, and now abandoned, for Cleaning Element and Method. In particular, this invention is concerned with plastic filaments formed by extruding a plurality of polymers, one over the other and each imparting a different useful characteristic to the composite filament.

It is known in the art to extrude or otherwise form filaments of the various synthetic plastic resins for various uses. Flexible formulations of such synthetic plastics as polyvinylchloride, polyethylene, polypropylene, and polyamide resins have been extruded or spun into fibers or filaments which have been woven into flexible webs and used as cloth or have been twisted into cord, rope and the like. Rigid formulations of polyamides, polystyrene, polyesters and the like have been applied primarily as bristles in the fabrication of brushes. However, when utilized as bristles in the fabrication of brushes and brushing devices, many of the rigid plastics suffer a number of shortcomings which limit their application and life. For example, bristles made of rigid plastic may be subject to permanent set or deformation when deflected during certain types of application or use, thereby resulting in a brushing article which soon loses its utility. Attrition on the bristles due to the abrasion of small particles may also lessen its utility. More important, the physical characteristics of the rigid plastic itself may limit its application. For example, while it may be desired to sweep a surface in the act of removing dirt therefrom, the rigid bristles may easily scratch or mar the surface. Most brush bristles made of synthetic plastic, are fabricated by shear cutting elongated plastic filaments to short lengths. Inherent in the cutting are sharp edges provided at both ends of the cut lengths thereof. Such sharp edges tend to scratch and cut most surfaces against which the bristles are brought to bear. Utilization of a softer or more flexible plastic will provide a bristle which does not have the stiffness necessary to perform brushing and cleaning functions effectively. While certain bristle structures have been taught in the prior art which employ a metal wire as a core, such filaments suffer a number of shortcomings for many uses and their applications are correspondingly limited. Metal, being substantially harder than plastic, will easily scratch most surfaces and when lengths of such metal wire filaments are cut and used, the outer sheathing soon wears off exposing the metal core which may easily scratch the surface to which the filaments are applied. Threads and other flexible cores have been utilized but these lack sufficient rigidity to permit the necessary wiring action. Accordingly, it is a primary object of this invention to provide a new and improved synthetic bristle. Another object is to provide a new and improved synthetic filament utilizable for bristles and the like and having substantially the rigidity of a conventional filament made of rigid plastic yet being substantially free of sharp edges which will scratch or mar surfaces against which they are brought.

Another object is to provide an improved filament producible by the extrusion of flexible and rigid plastics and having the characteristics of each applied to advantage in the composite structure.

Another object is to provide a composite extrusion having separate longitudinal flexible and rigid portions joined by the commingling of the material of each with each of said portions being fabricated by extruding compatible flexible and rigid formulations of the same polymer, one on the other, so as to define an improved structure free of the degrading effects often experienced when different polymers are brought into abutment with each other or united.

Another object is to provide a composite filament having a rigid core and a flexible sheaving cooperating to enhance the use of the filament.

Another object is to provide a new and improved filament for use in brushes and the like and having a tip which is rounded and free of sharp edges which would ordinarily scratch surfaces against which the brush made thereof may be brought to bear against.

Another object is to provide a composite filament for use in brushes and the like and having a relatively soft tip which may gently wipe the surface it is brought to bear against, said filament having a firm structure with substantially the rigidity of conventional bristles.

Another object is to provide an improved structure in a composite wiping material at least a portion of which is made of flexible cellular plastic expanded in situ on a base.

With the above and such other objects in view as may hereinafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 2:
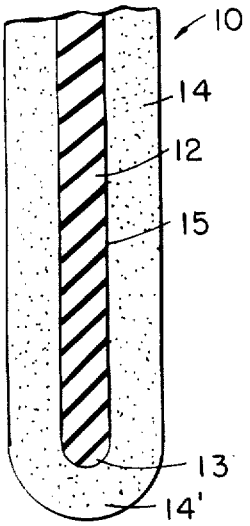

There is shown in FIGS. 1 and 2 an extruded or otherwise formed filament element which may be used for various cleaning, polishing or wiping purposes to be described hereafter. The element 10, if produced by extrusion, is elongated in shape and has a constant cross section. It comprises a core element 12 of a first material which is surrounded by a jacket or layer of a second material 14 illustrated as a flexible, cellular plastic such as cellular polyvinyl chloride, cellulose acetate, urethane or the like. In a preferred form of the invention the core 12 is made of a more rigid plastic than that comprising the jacket or covering 14, and may comprise the more rigid formulations of polyvinyl chloride, polystyrene, polyethylene, polypropylene or the like. In a preferred method of fabricating the composite filament, both the core 12 and the jacket 14 may be simultaneously extruded to form the single element 10 in a process whereby at least one of the two materials is introduced against the other while in a semi-molten condition such that, when it solidifies, it will molecularly bond to or become integral with the other by welding or heat fusion.

The cleaning element 10 illustrated in FIGS. 1 and 2 may also be fabricated by dipping the core element 12 into a container of a solution or molten quantity of the material of which the jacket or coating 14 is made and thereafter removing 12 with the material 14 coated thereon. Subsequently, the coating 14 may be foamed by heating or further processing or may contain a foaming or blowing agent operative to expand same in situ on core 12.

In application of the structure illustrated in FIGS. 1 and 2 as a cleaning element the core element 12 serves as a stiffener or main support for the filament 10 while the jacket 14 provides a softer and more flexible surface which may be used for wiping, buffing or cleaning functions without marring or scratching the surface of the workpiece, a condition which may exist if said surface were engaged by the core element 12 per se.

Notation 15 refers to the interface between 12 and 14 which interface may not discernibly exist if both the core 12 and jacket 14 are simultaneously extruded of thermoplastic materials. The end 13 of 12 is illustrated as being rounded and surrounded by material 14' which is an extension of the covering or jacket material 14 surrounding core 12.

For many brushing and wiping operations, a conventional synthetic bristle, utilized in an array of same defining a brushing surface, is relatively abrasive to the work surface engaged thereby. This is due to the fact that the conventional self-supporting bristle is formed of a relatively rigid plastic by the continuous extrusion of said plastic into a filament or filaments and the individual brush bristles are cut therefrom by the shearing action of a blade such as a rotary cutter. Regardless of the angle at which the cutter shears lengths of bristles off the longer extruded filament, inherent in the shearing action is the development of sharp edges at each end of the cut lengths of filament. When assembled and secured in an array to a base to define multiple rows of filaments, such a multitude of sharp-edged members are operative to scratch, cut or tear material against which the brush is brought to bear. For many brushing applications, it may be desirable to derive the wiping or polishing action of individual stiff bristles without the inherent scratching, cutting or tearing action created by the sharp edges of the bristle. For example, in cleaning teeth, bristles cut from relatively rigid plastics may easily irritate or cut the gums.

The jacket material 14 of the filament structure of FIG. 2 may also be made of a non-cellular plastic more flexible than the material of the core 12. Similarly, the rounded end 13 of core filament 12 permits use of said core filament as a bristle per se for many brush applications as it is void of sharp edges.

Figure 3:
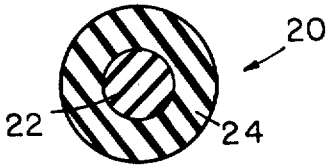
Figure 4:
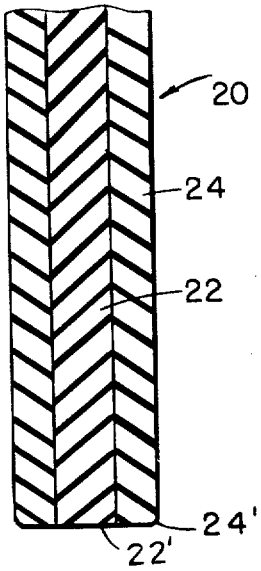

The filament structures illustrated in FIGS. 1 to 4 are operative to provide many of the beneficial features found in stiff or rigid brushing elements or bristles without the mentioned disadvantages inherent in shear cut filaments or bristles fabricated of rigid plastics. This is accomplished by fabricating the filament to be cut to define individual bristles, each having a core of rigid plastic and having a more flexible plastic as a sheaving formed in situ on the core along the entire length of the bristle. Thus, regardless of the angle at which the shearing cut is made to sever individual bristle elements from the main extrusion, there will always be provided flexible sheaving material outward of the more rigid core which will serve as a buffer or cushion material compressively engaged against the surface being wiped by the more rigid core but protecting said surface from direct engagement by said core. Core element 12 may also etxend completely to the end of the jacket 14 as illustrated in FIG. 4, depending on the intended application of said element.

*In FIG. 1' is shown a modified form of the composite extrusion shown in FIG. 1 having a flexible, cellular plastic jacket or covering 14' surrounding a core element 12' which is a hollow tubular extrusion of a polymeric material such as those hereinbefore described. The core portion 12' thus may be utilized for conducting or delivering a fluid through the passageway in the tubular portion 12' of the composite extrusion.*

If the material comprising the jacket 14 were to be utilized for the entire wiping element 10, it would not have sufficient rigidity or internal support to properly effect many cleaning operations. The stiffened internal support or core 12 serves as means for retaining the element in a predetermined upstanding shape and for transmitting or imparting forces to the sheaving 14 and imparted to said core from a base to which the element 10 is secured so as to brush or wipe the surface being engaged thereby.

FIGS. 3 and 4 illustrate another form of this invention defining an elongated element 20 which comprises a core 22 made of a first and more rigid material than a surrounding sheaving or jacket 24. The jacket is preferably made of a flexible thermoplastic material but is unlike the core material comprising of FIGS. 1 and 2 that it is not porous or cellular. Materials of which the core 22 may be made may comprise a rigid or semi-rigid vinyl, polyethylene or the like while the covering or jacket 24 may comprise a more flexible formulation of the same or other compatible thermoplastic material comprising the core. The member 22 is preferably formed by simultaneously extruding both core and jacket as a unitary rod or filament and may serve many of the functions hereinabove described for the member 10 such as buffing, wiping, polishing or the like wherein the flexible jacket 24 serves as a yieldable medium and the more rigid core 22 serves as means for stiffening or rigidizing the assembly 20 so that a force applied to that end of element 20 which is secured to a base member will be transmitted along the length thereof to the surface of a workpiece without substantial loss. It is obvious that if the entire member 20 were made of a flexible plastic material such as that comprising the covering or coating 24, it would merely deflect against a surface to be cleaned, buffed or wiped thereby without the application of sufficient force to be as effective in such action as when provided with the stiffer core member or portion 22. As in the case of the element of FIG. 1, the structure illustrated in FIGS. 3 and 4 may be fabricated by simultaneously extruding both materials or extruding and forming the core member 22 first and continuously feeding it to means for extruding the outer jacket 24 thereon.

Notation 22' refers to the end face of the core element 22 which is formed when the member 20 is sheared to length. Notation 22'' refers to one of the circular sharp edges at the end of core element 22 formed when the cut is made. It is seen that the end portion 24' of sheaving 24 serves as means for preventing edge 22'' from normally engaging the surface of a work member when element 20 is laterally moved across said work surface as in most brushing functions. Rather, the edge 24'' of sheaving 24 is first brought against the work surface during the brushing action. Since the material comprising sheaving 24 is relatively more flexible than that of which core 22 is made, a non-abrading wiping or brushing action is attained and the material at the end of sheaving 24 will be compressively deflected against the work surface to prevent the sharp edge 22'' of core material 22 from scratching or cutting the work surface.

If the core members 12 or 22 are provided as hollow, tubular extrusions, they may be utilized for delivering various fluid materials through the cleaning or wiping members from the base to which they are secured to the surface of the workpiece. For example, if the device is utilized as a waxing means, solutions of various waxes or liquid wax may be delivered through such a hollow tubular core by centrifugal force and/or pressurizing the source of the supply of the wax material.

Many dissimilar polymers have corrosive effects on one another. Vinyls, for example, are not compatible with many other polymers. Polyethylenes and polypropylenes are not easily welded or bonded to other polymers. I have discovered that most suitable combinations of which to produce the composite filament structures of FIGS. 1 to 4 are rigid and flexible formulations of the same polymer such as plasticized and unplasticized vinyl, high and low density polyethylene or polypropylenes. Such combinations are not only compatible with each other but form composite articles by extrusion which exhibit little or no interfacial degradation, may have substantially the same melting points and easily unite in molecular bonds when brought together.

In another form of the invention the structures illustrated in FIGS. 1 to 3 may represent improved textile fibers or filaments capable of being woven into cloth for wearing apparel and other fabrics. For example, FIG. 1 may represent a textile filament comprising a core 12 made of either a single mono-filament or a fine thread of any suitable organic or synthetic plastic material or glass fiber or fibers surrounded by the foam jacket 14 of expanded cellular plastic. The jacket 14 preferably comprises the major portion of the filament 10 and is in the order of .005" to .030" or greater in outside diameter while the core element or thread 12 may be in the order of .010" in diameter or less. The jacket 14 may comprise foamed or expanded vinyl, urethane acetate or the like while the core member 12 is preferably a synthetic textile filament or yarn such as nylon, Dacron, rayon, Orlon, polypropylene or glass having substantially greater tensile strength than the tubular formation 14 which surrounds it and thereby provides a composite article 10 of superior strength characteristics, which may be woven into various fabric formations. The article 10 may be produced by extruding or otherwise providing the core member 12 as a continuous filament or thread and extruding thereover the molten resin comprising the jacket 14, in the presence of a foaming agent that is gaseous at the extrusion temperature whereby said resin immediately foams or expands into a cellular plastic as or shortly after it is coated onto 12.

The resulting composite article 10 possesses the softness, flexibility and insulating characteristics of the cellular plastic and the tensile strength of the flexible filament or thread core 12.

Figure 5:
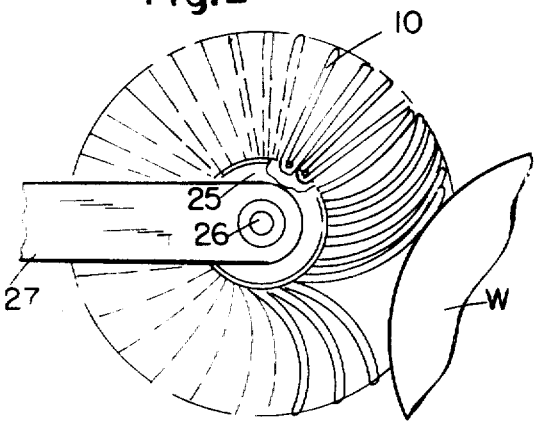

In FIG. 5 is shown a cleaning device employing a plurality of composite filaments 10 or 20 secured to a base 25 which is illustrated as a drum and is rotatable on a shaft or axle 26 which is supported by a base or frame 27 in a manner to permit rotation of the drum 25. Drive means for the drum assembly 25 (not shown) may be provided including a motor for rotating said drum at constant speed. The drum assembly is shown positioned adjacent a workpiece W so that the elongated filaments or wiping elements 10 compressively engage the surface of W as drum 25 rotates and are urged thereagainst as a result of the semi-rigid assembly of the individual elements 10 and the drum 25 whereby the stiffened or rigidized core of each element is used as a means for directing and compressively engaging the element against the outer surface of W. The base 25, of course, may have any suitable shape. Fastening of one or a plurality of the wiping elements 10 may be provided as illustrated in my application Ser. No. 477,467 or by any suitable means.

Figure 6:
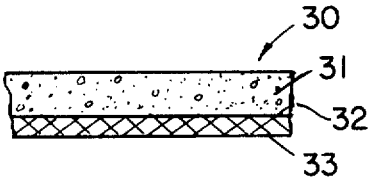
Figure 1:
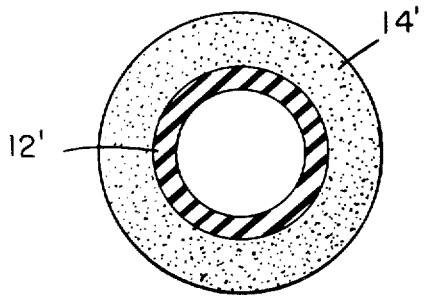

FIG. 6 illustrates structural details of a cleaning and wiping element in the form of a sheet, the major portion of which comprises a flexible, synthetic cellular plastic material. The cleaning element 30, a fragment of which is shown in cross section, comprises a layer or sheet 31 of expanded, cellular plastic such as cellular cellulose acetate, celluar polyurethane, cellular flexible polyvinyl chloride or other suitable synthetic sponge-like cellular material. Bonded or mechanically secured to one side or face of the cellular plastic member 31 is a sheet 32 of woven material such as cloth, canvas, netting or the like and made up of a plurality of threads or filaments of textile material woven into a cloth or sheet.

The cleaning member 30 may be produced in a number of manners depending on the desired end product. For example, both the sheets 31 and 32 may be provided as separate, preformed webs which may be conveyed or otherwise positioned into facial contact with each other after the application of a suitable adhesive to either or both abutting surfaces whereby the two will become adhesively bonded together.

In another method of fabricating the combined cleaning element 30 of FIG. 6, the plastic material which eventually comprises the layer 31 of cellular plastic, is extruded or otherwise applied onto the upper surface of 32 and blown or foamed thereon to form a substantially uniform layer. By this method, the cellular plastic, while still in a liquid, unfoamed state, may be made to penetrate the spaces between the threads or filaments of the cloth base 32 so that, upon foaming and solidification, said layer 31 will extend into and preferably through the cloth 32 resulting in a mechanical assembly of the two. If the plastic comprising layer 31 is such that it possesses adhesive characteristics when in contact with the individual thread or filament elements of the cloth or canvas 32, the combined mechanical and adhesive assembly means will provide a superior fastening assembly in which the two layers are substantially integral with each other and may not be easily torn apart or separated. The superior strength afforded by the textile webbing or canvas base will permit the utilization of the sponge sheeting in many applications where the cellular plastic layer would not be applicable per se. In particular, the combined cleaning article or web 30 may be applied where it may be subjected to tensile forces which would ordinarily tear the relatively weaker, unsupported cellular plastic sheeting. The article or sheet 30 may be utilized, for example, as a buffing belt, wiping and polishing cloth, etc.

Other applications for the combined sheeting illustrated in FIG. 6 include various articles of manufacture made thereof or in combination with other materials.

I claim:

1. An article of manufacture for use as a cleaning and wiping element with a plurality of similar elements comprising an elongated, flexible filament made of a plurality of synthetic polymeric materials, said filament having a core portion made of a first polymeric material and surrounded by a jacket portion, the material comprising said jacket being a flexible, synthetic plastic supported along substantially the length of said element by said core and integrally bonded thereto, said core being of a more rigid polymeric material than said jacket, the material of said jacket portion extending beyond one end of said core portion and providing a flexible tip portion for said filament element which may be used for wiping or buffing purposes.

2. An article of manufacture in accordance with claim 1, said flexible tip portion being rounded at its end.

3. An article of manufacture for use as a cleaning and wiping element with a plurality of similar elements comprising an elongated, flexible filament made of a plurality of synthetic polymeric materials, said filament having a core portion made of a first polymeric material and surrounded by a jacket portion, the material comprising said jacket being a flexible, synthetic plastic supported along substantially the length of said element by said core and integrally bonded thereto, said core being of a more rigid polymeric material than said jacket, the material comprising said jacket being an expanded, cellular synthetic plastic formed in situ on said more rigid core portion.

*4. An article of manufacture comprising an elongated flexible extrusion made of a plurality of synthetic poly-*

*meric materials, said extrusion having a tubular core portion made of a polymeric material and surounded by a jacket portion, the material comprising said jacket being a flexible synthetic plastic supported along substantially the length of said element by said core and integrally bonded thereto, said core being made of a more rigid polymeric material than said jacket, the material comprising said jacket being an expanded, cellular synthetic plastic formed in situ on said more rigid core portion.*

*5. An article of manufacture in accordance with claim 4 the materials of said core and jacket portions comprising repectively rigid and flexible formulations of the same polymer such as high and low density polyethylenes and polypropylenes and plasticized and unplasticized formulations of vinyl resins.*

References Cited

The following references, cited by the Examiner, are of record in the patented file of this patent or the original patent.

UNITED STATES PATENTS

| | | | |
|---|---|---|---|
| 2,918,394 | 12/1959 | Smith | 138—137 |
| 2,932,323 | 4/1960 | Aries | 138—137 |
| 3,175,586 | 3/1965 | Tatsch | 138—137 |
| 3,322,611 | 5/1967 | Stevenson | 57—140 |
| 1,782,018 | 11/1930 | Staines | 15—230 X |
| 2,100,138 | 11/1937 | Heldt | 15—179 |
| 2,328,998 | 9/1943 | Radford | 15—230 |
| 2,409,660 | 10/1946 | Briggs | 57—153 |
| 2,426,328 | 8/1947 | Wandel et al. | 15—159.1 |
| 2,804,728 | 9/1957 | Politzer et al. | 15—118 X |
| 2,845,648 | 8/1958 | Peterson | 15—159.1 X |

FOREIGN PATENTS

| | | |
|---|---|---|
| 551,348 | 1/1958 | Canada. |

WALTER A. SCHEEL, Primary Examiner

L. G. MACHLIN, Assistant Examiner

U.S. Cl. X.R.

264—210